Figure 1:
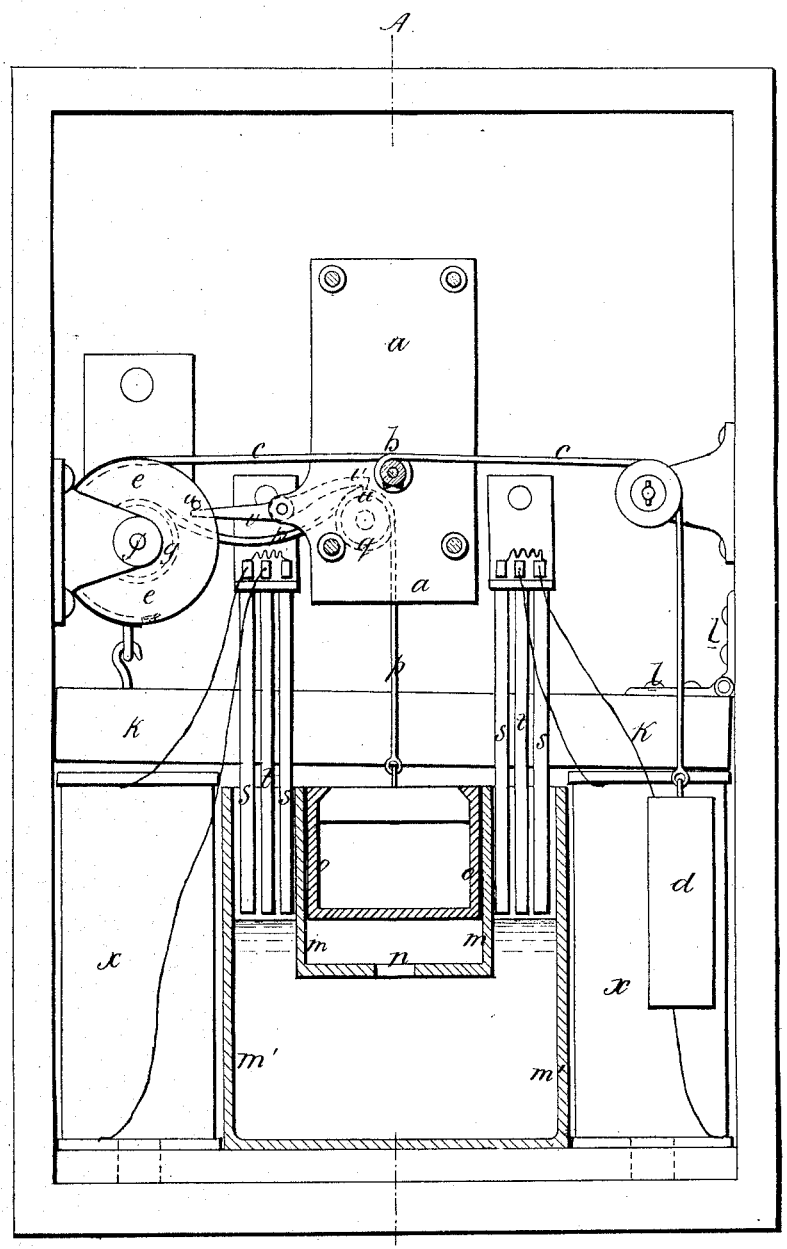

J. W. WIGNALL.
Electric Winding-Mechanism for Clock-Work.
No. 165,396. Patented July 6, 1875.
FIG. 2.
FIG. 3.
FIG. 4.
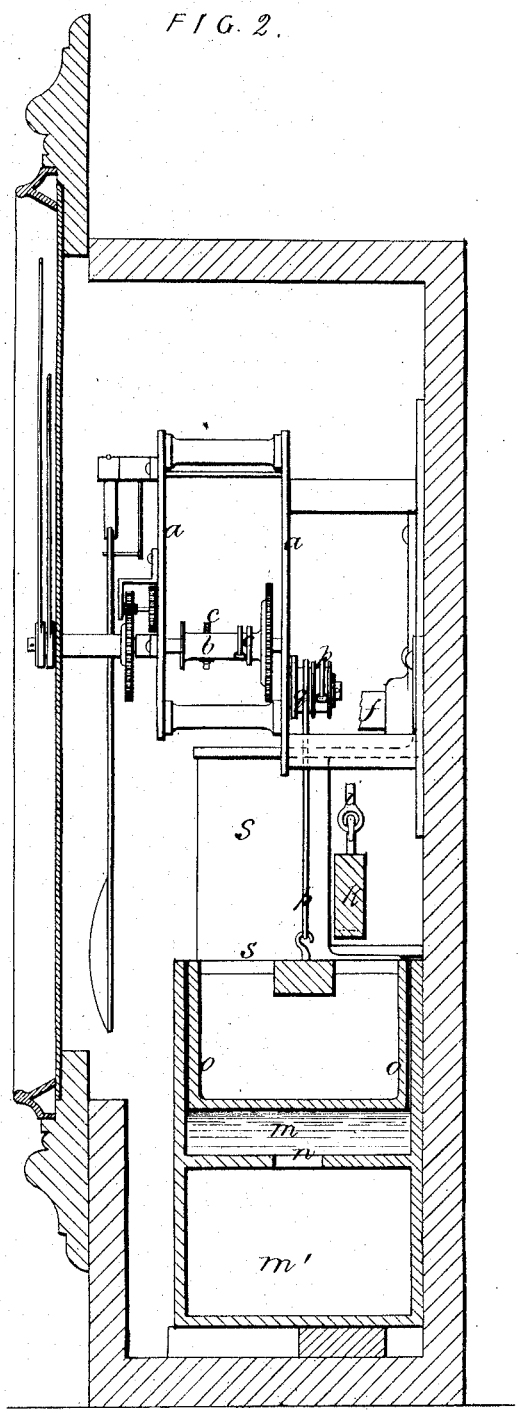
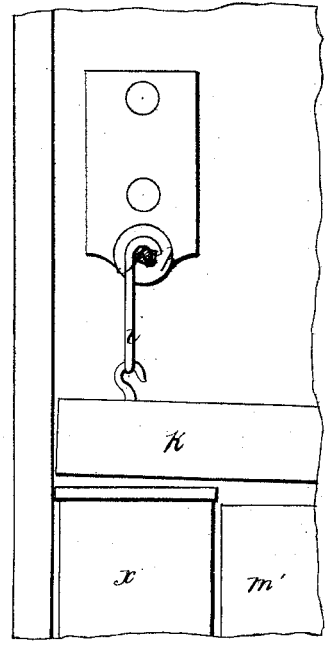
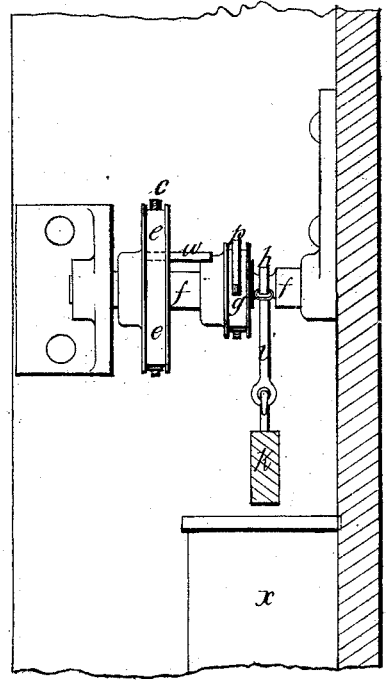
Witnesses: T. E. Davies, John Hughes
Inventor: John William Wignall

UNITED STATES PATENT OFFICE.

JOHN WILLIAM WIGNALL, OF MANCHESTER, GREAT BRITAIN.

IMPROVEMENT IN ELECTRIC WINDING MECHANISM FOR CLOCK-WORK.

Specification forming part of Letters Patent No. 165,396, dated July 6, 1875; application filed December 7, 1874.

*To all whom it may concern:*

Be it known that I, JOHN WILLIAM WIGNALL, of Manchester, in the county of Lancaster, Kingdom of Great Britain and Ireland, have invented Improved Self-Winding Apparatus for Clocks, Musical-Boxes, and other similar purposes, of which the following is a specification.

This invention relates to the construction of a self-winding apparatus which I call an "electrical winder," and which is applicable to clocks, musical-boxes, or other similar mechanism, wherein the motive power is derived from the descent of a weight which requires to be wound up from time to time to keep the mechanism in action.

The invention consists principally of an electro-magnet excited by a bichromate or other suitable battery, and so combined and connected with the main weight of the clock or other mechanism that the descent of the latter, to a certain point, sets free a catch and puts the battery into action, which causes the electro-magnet to attract the armature. The movement of the latter toward the magnet causes a lever to draw up the main weight and this puts the battery out of action, (by raising the zinc electrode out of the solution, or by withdrawing the solution from the electrode,) and the apparatus is then in a position to wind up the weight again, as soon as the latter has descended again to the given point. The battery thus being only in action momentarily at intervals during the winding up of the weight, will retain its power for months or even years, and keep the mechanism constantly going, and all that is requisite to keep the movement perpetual is to supply fresh solution when the action becomes too weak to lift the weight, and to renew the zinc electrode when necessary.

The battery which I prefer to employ is that known as a "bichromate battery," consisting of a suitable vessel to contain the solution of bichromate of potash and sulphuric acid, a wooden-top or rail from which are suspended two carbon electrodes about half an inch apart, a wire being connected to each carbon by means of a brass clamp. The zinc electrode passes freely between the two carbons and (if the electrode is to be movable) it is attached to a brass sliding rod, by means of which it may be lowered into the solution or raised up out of it so as to put the battery out of or into action as required. The electro-magnet is a stout piece of soft iron bent in the form of a horseshoe, or two cylinders connected together, round the legs of which are coiled several layers of stout silk-covered copper wire, the extremities of which have screws firmly soldered to them to allow of the attachment of the wires proceeding from the battery. At the end of the legs of the electro-magnet is the armature, one end thereof being firmly secured or hinged to the frame or case, and the other connected with the lever that winds up the main weight. On this lever is a piece of brass with a wire firmly screwed in it, and which at the up or down stroke of the lever releases or engages a catch which acts on the teeth of a ratchet-wheel attached to one side of the pulley or drum. To this pulley are attached two cords, one connected to the brass rod, which carries the zinc electrode and the other (one the other side of the center of the pulley) to a weight a little heavier than the zinc electrode, so that it can raise the latter and keep it out of the liquid in the cell.

It will be evident that in order to carry the zinc electrode into the liquid when the battery is required to be in action, a supplemental weight must be caused to attach itself when the top lever is raised so as to enable the zinc electrode to rise out of the liquid as soon as the electro-magnet has accomplished the winding up of the weight.

This is effected by the winding-lever carrying a supplemental weight which rises with it in its lifting motion, but leaves it at the end of the stroke, in consequence of the ratchet opposing the backward action of the pulley until the winding-lever releases the locking-lever and allows it to go back. The supplementary weight is kept up in its position until the time for rewinding arrives by means of a lever which acts like the one already described, but in an opposite direction. Instead of raising and lowering the zinc electrode the latter may remain stationary, and the level of the liquid may be raised or lowered as required by means of a float or otherwise. In order to keep the wires always in metallic contact, whether the zinc electrode is immersed in the liquid or not, I sometimes employ a glass-tube filled with mercury, and of such a length that a wire (one end of which is soldered to the rod which carries the zinc electrode) may dip into the mercury and not leave it during the whole length of the up or down stroke of the brass rod. The wire from the electro-magnet also dips into the mercury, and thus the two wires are always in metallic contact whether the zinc is immersed or not, and hence there is an entire absence of the electric spark, the destructive effect of which is well known to electricians. But when it is arranged so as to put the battery into or out of action by raising and lowering the surface of the liquid, the electrodes being stationary, the wires may be soldered together so that they are always in metallic contact, in which case also there is no spark.

This arrangement I find to be much more simple than the preceding, and I will therefore proceed to describe its construction more in detail with the aid of the annexed drawing.

Figure 1 is a vertical section of a self-winding clock, constructed according to my invention. Fig. 2 is a section taken through about the line A B in Fig. 1, and Figs. 3 and 4 are detached views of separate parts of the mechanism.

$a\ a$ is the ordinary clock-movement of which $b\ b$ is the main arbor round which the central part of the chain $c\ c$ is coiled, one end of the latter supporting the main weight $d\ d$, which propels the mechanism of the clock, and the other end being attached to the pulley $e\ e$ for a purpose hereinafter described. The pulley $e\ e$ is fixed on an arbor, $f\ f$, to which are also fixed two other pulleys, $g\ g$ and $h\ h$, of much smaller diameter. To the pulley $h\ h$ is fixed the chain or cord $i\ i$, the other end of which is attached to the armature $k\ k$, which is hinged to the case at $l\ l$. The battery vessel is made with an inner cell, $m\ m$, and an outer cell connected together by an opening, $n\ n$. Inside the cell $m\ m$ is a float or plunger $o\ o$, resting on the surface of the bichromate solution, and connected by a chain, $p\ p$, passing over a pulley, $q\ q$, to the pulley $g\ g$ on the arbor $f\ f$, to which latter pulley its end is fixed. $s\ s$ are the carbon electrodes, and $t\ t$ the zinc which are fixed in such a position that when the battery is required to be out of action their lower extremities do not touch the solution, but when the float or plunger $o\ o$ descends, it forces the solution into the outer cell, so that it rises into contact with the electrodes. The pulley $q\ q$ is provided with a pin or tooth, $u$, and a catch, $v\ v$, the other end of this catch being acted upon by a pin, $w$, fixed in the side of the pulley $e\ e$. The action is as follows: Supposing the apparatus to be in the position shown in Fig. 1, with the main weight $d\ d$ descending and keeping the clock in action by means of the chain $c\ c$ coiled round the arbor $b\ b$, the catch $v\ v$ holding the pin or tooth $u$, and keeping up the float or plunger $o\ o$, while the chain $p\ p$ becomes slack between the pulleys $q$ and $g$, as shown by the dotted curved line. As soon as the chain $c\ c$ has drawn the pulley $e\ e$ so far round that the pin $w$ reaches the end of the catch $c\ c$, it releases the other end from the pin or tooth $u$, and the float or plunger $o\ o$ descends by its own weight, and forces the bichromate solution from the inner to the outer cell, where it rises till it comes into contact with the electrodes. The magnet $x\ x$ is immediately excited and attracts the armature $k\ k$, which, by pulling the arbor $f\ f$ round in the reverse direction, winds up the main weight $d\ d$, and at the same time raises the plunger $o\ o$, which is held by the catch $v\ v$. As soon as the plunger is raised, the bichromate solution recedes from the electrodes, the electric current ceases, when the weight $d\ d$ commences its descending movement, gradually raising the armature as before, and so on continuously, so long as the strength of the battery remains sufficient to lift the weight $d\ d$.

I claim as my invention—

The combination in a clock operated by a weight, of an armature, $k$, of an electro-magnet, connected to the shaft of the winding-drum, with mechanism substantially as described for putting the battery into and out of action, as for the purpose set forth.

In testimony whereof I have signed my name to this specification in the presence of two subscribing witnesses.

JOHN WILLIAM WIGNALL.

Witnesses:
T. E. DAVIES,
JOHN HUGHES.